United States Patent
Allen et al.

(10) Patent No.: US 10,368,194 B2
(45) Date of Patent: **\*Jul. 30, 2019**

(54) LOCATING MISPLACED MOBILE COMPUTING DEVICES

(71) Applicant: International Business Machines Corporation, Armonk, NY (US)

(72) Inventors: Ira L. Allen, Dallas, TX (US); Gregory J. Boss, Saginaw, MI (US); Andrew R. Jones, Round Rock, TX (US); Kevin C. McConnell, Austin, TX (US); John E. Moore, Jr., Brownsburg, IN (US)

(73) Assignee: International Business Machines Corporation, Armonk, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 15/436,939

(22) Filed: Feb. 20, 2017

(65) Prior Publication Data

US 2017/0164154 A1    Jun. 8, 2017

Related U.S. Application Data

(63) Continuation of application No. 14/678,031, filed on Apr. 3, 2015, now Pat. No. 9,668,100.

(51) Int. Cl.
*H04W 4/02*    (2018.01)
*H04W 4/06*    (2009.01)
*H04W 8/00*    (2009.01)
*G01C 21/36*    (2006.01)
*G01S 19/42*    (2010.01)

(52) U.S. Cl.
CPC ........ *H04W 4/023* (2013.01); *G01C 21/3617* (2013.01); *G01S 19/42* (2013.01); *H04W 8/005* (2013.01); *H04W 4/06* (2013.01)

(58) Field of Classification Search
CPC .. H04W 4/023; H04W 8/005; G01C 21/3617; G01S 19/42
See application file for complete search history.

(56) References Cited

U.S. PATENT DOCUMENTS 7,233,782 B2 \*    6/2007    Bao ................. H04L 63/08
                                                                   455/404.2
8,284,748 B2 \*    10/2012    Borghei ............. H04W 4/021
                                                                   370/252

(Continued)

FOREIGN PATENT DOCUMENTS

| CN | 102982170 A | 3/2013 |
| WO | 2008029099 A1 | 3/2008 |
| WO | 2013101963 A1 | 7/2013 |

OTHER PUBLICATIONS

IBM, Appendix P, List of IBM Patents or Patent Applications Treated as Related, dated Feb. 20, 2017, 2 pages.

(Continued)

*Primary Examiner* — Azizul Choudhury
(74) *Attorney, Agent, or Firm* — Aaron N. Pontikos

(57) ABSTRACT

Locating misplaced mobile computing devices through transmission of location information. Mobile computing devices periodically request information from surrounding mobile computing devices to more accurately identify the location where a mobile computing device was misplaced.

20 Claims, 2 Drawing Sheets

(56) References Cited

U.S. PATENT DOCUMENTS

| | | | |
|---|---|---|---|
| 2002/0019238 A1* | 2/2002 | McDonnell | G01S 13/74 455/456.5 |
| 2007/0150444 A1 | 6/2007 | Chesnais et al. | |
| 2008/0045236 A1 | 2/2008 | Nahon et al. | |
| 2008/0181180 A1 | 7/2008 | Karaoguz | |
| 2008/0215720 A1* | 9/2008 | Westin | H04L 29/06 709/224 |
| 2012/0178476 A1 | 7/2012 | Ortiz et al. | |
| 2013/0254413 A1 | 9/2013 | Steele et al. | |
| 2014/0082099 A1* | 3/2014 | Burns | H04L 67/26 709/206 |
| 2014/0141720 A1* | 5/2014 | Princen | H04L 63/0407 455/41.2 |
| 2014/0162601 A1* | 6/2014 | Kim | H04W 12/06 455/411 |
| 2014/0273920 A1* | 9/2014 | Smith | H04W 64/00 455/404.2 |
| 2014/0274121 A1* | 9/2014 | Raniere | H04W 4/02 455/456.1 |
| 2014/0372743 A1* | 12/2014 | Rogers | H04L 9/3234 713/2 |
| 2016/0295365 A1 | 10/2016 | Allen et al. | |

OTHER PUBLICATIONS

U.S. Appl. No. 15/436,939, filed Feb. 20, 2017.
U.S. Appl. No. 14/678,031, filed Apr. 3, 2015, U.S. Pat. No. 2016-0295365 A1.
"Tile", website accessed Feb. 23, 2015, © Copyright 2015 Tile Inc., <https://www.thetileapp.com/>.

* cited by examiner

LOCATING MISPLACED MOBILE COMPUTING DEVICES

BACKGROUND

The present invention relates generally to the field of computing device management, and more particularly to locating misplaced mobile computing devices.

Individuals carry a variety of mobile computing devices (smartphones, smartwatches, wireless headsets, tablets, e-readers, laptops, etc.), each of which has the ability to connect with other mobile computing devices. Individuals lose a multitude of mobile computing devices each year, some of which are not recovered. These losses result in costs to consumers and insurance companies.

SUMMARY

According to an aspect of the present invention, there is a method, computer program product, and/or system that performs the following steps (not necessarily in the following order): (i) receiving a set of discovery response data from a mobile computing device; (ii) receiving a query for the set of discovery response data of the mobile computing device; and (iii) responsive to the query, transmitting the set of discovery response data. At least the transmitting step is performed by computer software running on computer hardware.

DETAILED DESCRIPTION

Figure 1:
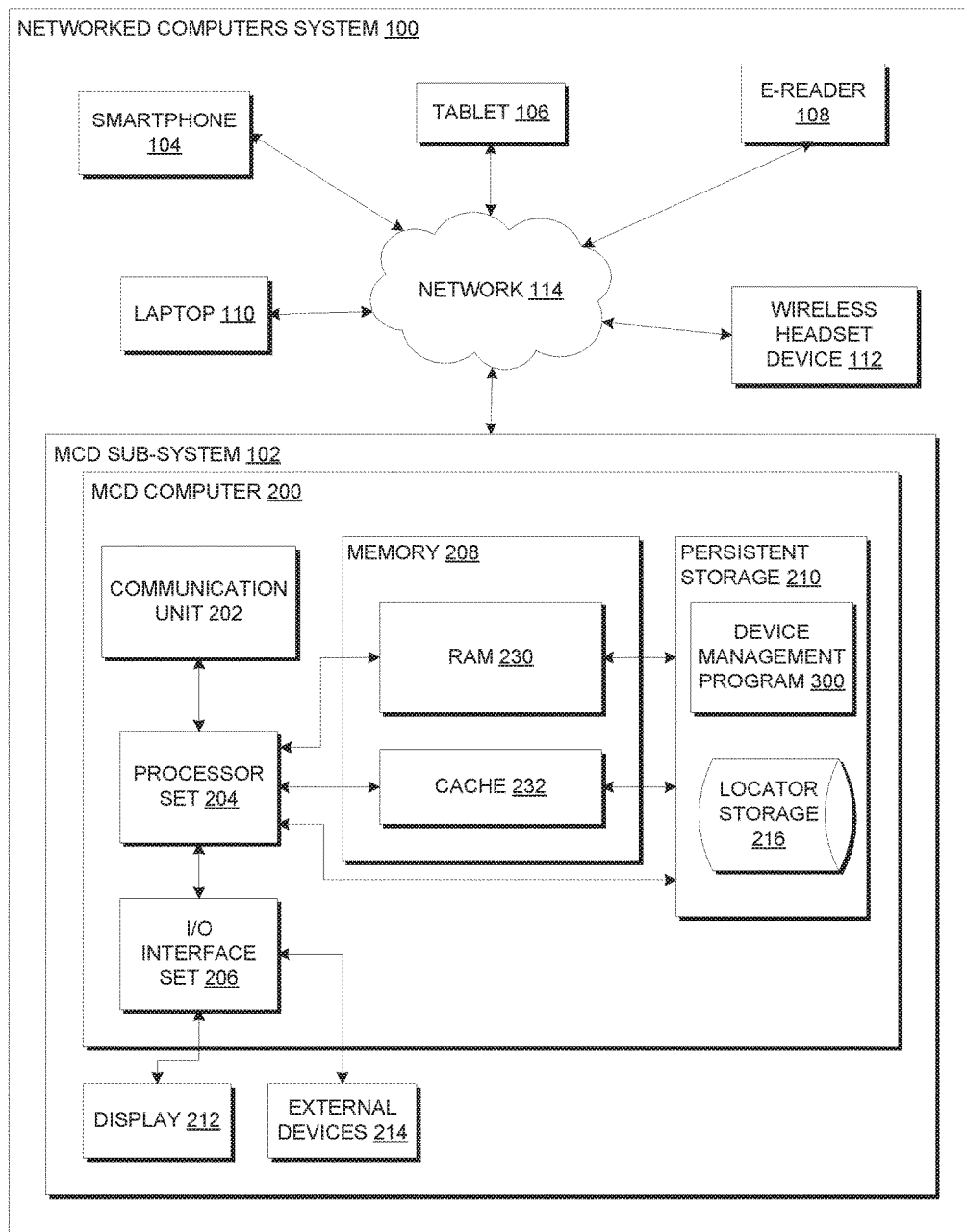
FIG. 1 is a block diagram view of a first embodiment of a system according to the present invention.

Locating misplaced mobile computing devices through transmission of location information. Mobile computing devices periodically request information from surrounding mobile computing devices to more accurately identify the location where a mobile computing device was misplaced. This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: mobile computing device (MCD) sub-system 102; smartphone sub-system 104; tablet sub-system 106; e-reader sub-system 108; laptop sub-system 110; and wireless headset device sub-system 112; communication network 114; mobile computing device (MCD) computer 200; communication unit 202; processor set 204; input/output (I/O) interface set 206; memory device 208; persistent storage device 210; display device 212; external device set 214; locator storage 216; random access memory (RAM) devices 230; cache memory device 232; and device management program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

II. Example Embodiment

Figure 2A:
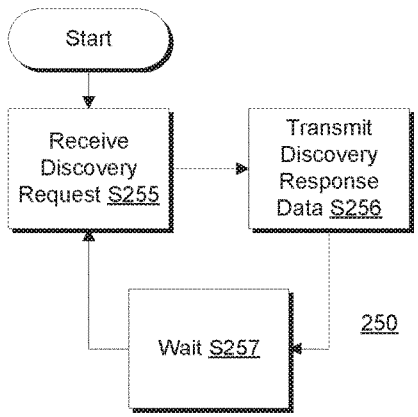
FIG. 2A is a flowchart, showing a first embodiment method performed, at least in part, by the first embodiment system.
Figure 2B:
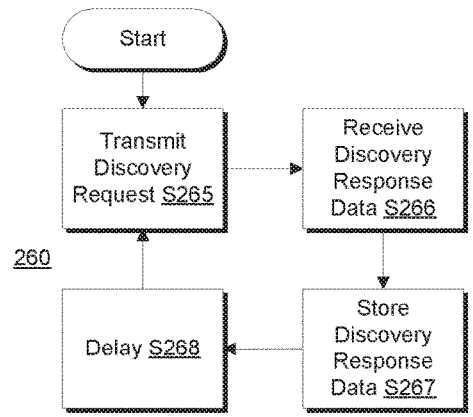
FIG. 2B is a flowchart, showing a second embodiment method performed, at least in part, by the first embodiment system.
Figure 2C:
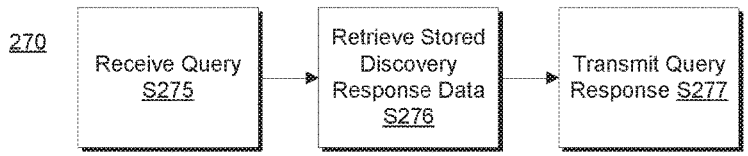
FIG. 2C is a flowchart, showing a third embodiment method performed, at least in part, by the first embodiment system.
Figure 3:
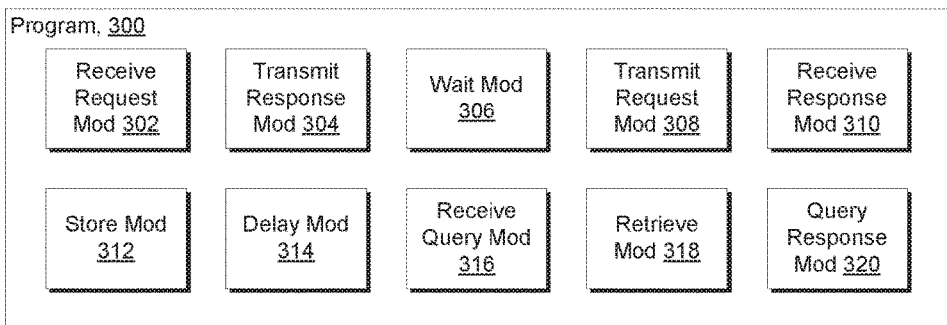
FIG. 3 is a block diagram view of a machine logic (for example, software) portion of the first embodiment system.

FIGS. 2A, 2B, and 2C show flowcharts 250, 260, and 270, respectively, to depict methods according to the present invention. FIG. 3 shows device management program 300 for performing at least some of the method steps of flowcharts 250, 260, and 270. This method and associated software will now be discussed, over the course of the following paragraphs, with extensive reference to FIGS. 2A, 2B, and 2C (for the method step blocks) and FIG. 3 (for the software blocks). To more fully explain the figures, an example is used, in which a user, Able, carries mobile computing device (MCD) sub-system 102 and smartphone sub-system 104 (FIG. 1). It should be noted that embodiments of the present invention are not limited in the number of mobile computing devices (MCDs) used. For better reader understanding, the method steps presented below are described from the perspective of MCD sub-system 102. For some embodiments of the present invention, each MCD operates independently to determine the presence of other MCDs and to respond to discovery requests of other MCDs.

Processing of flowchart 250 begins at step S255, where receive request module ("mod") 302 receives a discovery request from an MCD. The discovery request is a public broadcast over a set of wireless network protocols to determine what, if any, other MCDs are within communication range. Alternatively, the discovery request is also sent over a set of wired network protocols. In some embodiments of the present invention, the discovery request is also transmitted to devices other than MCDs. In some embodiments of the present invention, the device making the discovery request is a device other than an MCD. In this example MCD sub-system 102 receives a discovery request from smartphone sub-system 104 over a radio frequency network protocol.

Processing proceeds to step S256, where transmit response mod 304 transmits a set of discovery response data to the MCD making the discovery request. The set of discovery response data includes one or more of, but is not limited to: (i) a unique MCD identifier; (ii) an obfuscated MCD identifier; (iii) the geographical location of the MCD (location information); (iv) the time; and/or (v) a remaining battery life. In some embodiments of the present invention, the MCD responding to the discovery request has primary location services (see Sub-Section IV, "Definitions," below), and transmits location information based on the primary location services. In some embodiments of the present invention, the MCD responding to the discovery request lacks primary location services and, instead, transmits location information based on secondary location services. Alternatively, an MCD contains a preloaded map to determine location information. In some embodiments of the present invention, the device transmitting the discovery response data has previously paired with the device from which it received the discovery request. In some of those embodiments, the device transmitting the discovery response data uses a unique MCD identifier, instead of an obfuscated MCD identifier. In some embodiments of the present invention, the device transmitting the discovery response data has not previously paired with the device from which it received the discovery request. In some of those embodiments, the device transmitting the discovery response data uses an obfuscated MCD identifier, instead of a unique MCD identifier. Because the discovery request is a public request, more than one MCD may respond. In some embodiments of the present invention, the MCD responding to the discovery request transmits the set of discovery response data over the same network protocol on which the discovery request was received. In some embodiments of the present invention, the set of discovery response data is transmitted over a different network protocol from the network protocol on which the discovery request was received. In this example, MCD sub-system 102 transmits a set of discovery response data to smartphone sub-system 104 over the same radio frequency network protocol as the network protocol on which MCD sub-system 102 received the discovery request. The set of discovery response data includes a unique MCD identifier and the GPS coordinates of smartphone sub-system 104.

Processing proceeds to step S257, where wait mod 306 waits for the MCD to receive a new discovery request. Upon receipt of a new discovery request, processing returns to step S255. In some embodiments of the present invention, the MCD receiving a discovery request skips step S257 because multiple discovery requests were received. In those embodiments, processing returns from step S256 directly to step S255. In some embodiments, the MCD never receives a new discovery request and processing never returns to step S255. In this example, MCD sub-system 102 waits approximately three minutes for smartphone 104 to transmit a new discovery request.

In parallel (but not necessarily simultaneously or concurrently) with processing of flowchart 250, processing of flowchart 260 begins at step S265, where transmit request mod 308 transmits a discovery request. In some embodiments of the present invention the discovery request is transmitted over a set of wireless network protocols to determine what, if any, other MCDs are within communication range. Alternatively, the discovery request is also sent over a set of wired network protocols. In this example, MCD sub-system 102 transmits a discovery request over an infrared network protocol to determine what, if any, devices are within communication range.

Processing proceeds to step S266, where receive response mod 310 receives a set of discovery response data. In some embodiments of the present invention, the MCD responding to the discovery request transmits the set of discovery response data over the same network protocol on which the discovery request was received. In some embodiments of the present invention the set of discovery response data is transmitted over a different network protocol from the network protocol on which the discovery request was received. In some embodiments of the present invention, there are no MCDs within communication range and no response is received. Alternatively, more than one MCD responds to the discovery request. In some embodiments of the present invention, the set of discovery response data does not include location information and the MCD that transmitted the discovery request uses its own location information as the location information for the set of discovery response data. In some of those embodiments of the present invention, the device that transmitted the discovery request uses secondary location services to determine its own location. In this example, MCD sub-system 102 only receives a set of discovery response data from smartphone sub-system 104, including the media access control (MAC) address of smartphone sub-system 104 as the unique MCD identifier. This set of discovery response data was transmitted over a radio frequency network protocol, different from the infrared network protocol on which MCD sub-system 102 transmitted the discovery request.

Processing proceeds to step S267, where store mod 312 stores the set of discovery response data, if any, to memory. In some embodiments of the present invention, discovery response data is stored to a segregated memory, such as locator storage 216 (FIG. 1). In some embodiments of the present invention, the set of discovery response data is stored in a table. Alternatively, the set of discovery response data is stored as a string of characters. In some embodiments of the present invention, a set of discovery response data is permanently retained. In some embodiments of the present invention, a set of discovery response data in memory is handled by: (i) overwriting the set of discovery response data for each MCD at every cycle; (ii) manually erasing the set of discovery response data; (iii) purging the set of discovery response data in a "first in, first out" method; (iv) prioritizing the set of discovery response data for a first set of MCDs over the set of discovery response data for a second set of MCDs; (v) purging the set of discovery response data after a specified period of time; and/or (vi) automatically purging the set of discovery response data, based on internal conditions. In some embodiments of the present invention, the set of discovery response data stored to memory cannot be accessed without input of the unique MCD identifier or the obfuscated MCD identifier correlated to that set of discovery response data. In some embodiments of the present invention, where an obfuscated MCD identifier was used, the set of discovery response data can only be accessed through a query over a wireless network protocol. In some embodiments of the present invention, no response is received in step S266. In those embodiments processing skips step S267 and proceeds directly to step S268. Alternatively, more than one MCD responds to the discovery request and processing of step S267 repeats for each set of discovery responses data received. In this example, MCD sub-system 102 stores the set of discovery response data received from smartphone sub-system 104 to locator storage 216.

Processing proceeds to step S268, where delay mod 314 delays processing. In some embodiments of the present invention, a delay is calculated from: (i) the end of a prior instance of step S268; (ii) the start of processing of one of steps S265, S266, or S267; and/or (iii) the start of processing of step S268. In some embodiments of the present invention, the determination of the length of the delay is made: (i) as a predetermined setting; and/or (ii) as an input. In this example, the length of the delay is predetermined and processing is delayed for five minutes. Processing returns to step S265.

In parallel (but not necessarily simultaneously or concurrently) with processing of flowcharts 250 and 260, processing of flowchart 270 begins at step S275, where receive query mod 316 receives a query for a set of discovery response data. In some embodiments of the present invention, the query relates to a misplaced MCD. In some embodiments of the present invention, the query is received as input from a user. Alternatively, the query is automatically generated based on predetermined settings or is received from a different MCD. The query includes at least one of: a unique MCD identifier and/or an obfuscated MCD identifier. In this example, Able has misplaced smartphone sub-system 104 and queries MCD sub-system 102 for the location information of smartphone sub-system 104 using the MAC address of smartphone sub-system 104 as the unique MCD identifier.

Processing proceeds to step S276, where retrieve mod 318 retrieves the set of discovery response data from memory. The appropriate set of discovery response data is located using the unique MCD identifier or the obfuscated MCD identifier received as part of the query. In some embodiments of the present invention, only the most recent set of discovery response data is retrieved. Alternatively, all sets of discovery response data in memory for that unique MCD identifier are retrieved. In this example, MCD sub-system 102 locates the most recent set of discovery response data in locator storage 216 (FIG. 1) for smartphone sub-system 104 using the corresponding MAC address.

Processing terminates at step S277, where query response mod 320 responds to the query by transmitting the set of discovery response data retrieved in step S276. In some embodiments of the present invention, the query response is transmitted over the same network protocol as the network protocol on which the query was received. In some embodiments of the present invention, the query response is transmitted using an input/output device, such as I/O interface set 206 (FIG. 1). Alternatively, the query response transmits: (i) directions from the present location to the location associated with the set of discovery response data; (ii) navigational instructions based, in part, on the location associated with the set of discovery response data; and/or (iii) the relative location of the location associated with the set of discovery response data compared to the present location.

III. Further Comments and/or Embodiments

Some embodiments of the present invention recognize the following facts, potential problems, and/or potential areas for improvement with respect to the current state of the art: (i) mobile computing devices are not always within range of or connected to a cellular or wireless network; (ii) devices that are turned off or have lost battery power cannot transmit location information; and (iii) not all mobile computing devices have primary location services.

In some embodiment of the present invention, an MCD transmits a set of discovery response data without first receiving a discovery request. This transmission of a set of discovery response data is made in a similar manner to the transmission of a discovery request. In some of these embodiments a delay is used between subsequent transmissions of discovery response data. In some embodiments, an MCD automatically generates a query if a specified amount of time has passed after the receipt of a set of discovery response data from a second MCD, with which the MCD has previously paired. Based on the automatically generated query, the MCD will transmit a query response as an alert that the second MCD is potentially misplaced. In these embodiments, queries are only automatically generated for devices with which the MCD has previously paired.

In one embodiment of the present invention, a user, Bob, is hiking in a national forest with no cellular signal. He has a smartphone and a tablet. Bob's tablet transmits discovery requests to his smartphone, which has GPS, on a two minute interval. In response, Bob's smartphone transmits a set of discovery response data containing its MAC address and GPS coordinates. Later, Bob realizes that he has misplaced his smartphone and queries his tablet for the five most recent sets of discovery response data for his smartphone. A pre-loaded map opens, showing the five most recent GPS coordinates received from the smartphone appearing in a cluster along the side of a trail. Bob walks back down the trail and finds his smartphone where he had taken a short break.

In one embodiment of the present invention, Charlie and David are hiking in a national forest with no cellular signal. They each have a smartphone, a tablet, and a wireless headset. Prior to setting out on the hike, Charlie and David pair all six devices. Charlie's smartphone, which has GPS, transmits discovery response data (including a unique device identifier, a timestamp, and GPS coordinates) to each of the other five devices in response to repeated discovery requests. Charlie realizes that he has misplaced his smartphone. Using his wireless headset, he retrieves the most recent GPS coordinates for his smartphone. Using the accelerometer integrated into the wireless headset and using the GPS on the tablet, Charlie is able to determine that his smartphone is approximately 100 yards behind him.

In one embodiment of the present invention, Eric is in a park. He has a smartphone and a wireless headset. Eric's smartphone transmits a set discovery response data (including an obfuscated unique device identifier, a timestamp, and location information) in response to a series of discovery requests made by a variety of MCDs in the park. Later, Eric realizes that he has misplaced his smartphone. Using his wireless headset, he queries nearby mobile computing devices to determine the most recent set of discovery response data transmitted by his smartphone. Based on the timestamps, Eric is able to determine the location of his smartphone.

Some embodiments of the present invention may include one, or more, of the following features, characteristics, and/or advantages: (i) mobile computing devices (MCDs) running an embodiment of the present invention are not required to opt-in to a system; (ii) a central server is not a required element for storing discovery response data from MCDs running an embodiment of the present invention; (iii) partitioned or segregated memory is used to limit the resource requirement for MCDs running an embodiment of the present invention; (iv) access to a cellular or wireless network is not required; (v) misplaced MCDs can be located regardless of battery power; (vi) information is protected through the use of obfuscated MCD identifiers when interacting with devices with which the MCD has not previously paired; (vii) MCDs have a record of the last known location of a misplaced MCD; and/or (viii) misplaced MCDs need not be found by another user to be located using an embodiment of the present invention.

Some embodiments of the present invention may include one, or more, of the following features, characteristics, and/or advantages: (i) differentiating between a second MCD with which an MCD has previously paired and a third MCD with which the MCD has not previously paired; (ii) sharing an obfuscated MCD identifier with MCDs with which the MCD has not previously paired; (iii) querying MCDs for a set of discovery response data correlating to a misplaced MCD; and/or (iv) alerting a user if a previously paired MCD does not transmit discovery response data.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including, but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication, and communication routes that have wireless and wired portions; data communication is not necessarily limited to:

(i) direct data communication; (ii) indirect data communication; and/or (iii) data communication where the format, packetization status, medium, encryption status, and/or protocol remains constant over the entire course of the data communication.

Receive/provide/send/input/output: unless otherwise explicitly specified, these words should not be taken to imply: (i) any particular degree of directness with respect to the relationship between their objects and subjects; and/or (ii) absence of intermediate components, actions, and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory, or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

To Pair (also pairing, paired): to create a direct node-to-node connection between two mobile computing devices (MCDs); sometimes referred to as a peer-to-peer or P2P connection.

Primary location services: methods by which an MCD determines its geographic location solely through reference to programs contained within the MCD (e.g., a global positioning system (GPS)).

Secondary location services: methods by which an MCD determines its geographic location that are not primary location services. Secondary location services include, but are not limited to: (i) triangulation based on cellular network signals; (ii) use of fixed wireless network communication signals; (iii) use of assisted GPS (AGPS); (iv) use of the MAC addresses of a set of fixed devices; (v) use of an integrated accelerometer to determine a distance traveled from a prior known location; and/or (vi) use of the primary location services of nearby devices.

What is claimed is:

1. A method comprising:
 receiving, by a first mobile computing device, a set of discovery response data from a second mobile computing device, wherein:
  an identity of the second mobile computing device is unknown to the first mobile computing device; and
  the set of discovery response data from the second mobile computing device includes an obfuscated identifier;
 receiving, by the first mobile device, a query from a third mobile computing device; and
 transmitting, by the first mobile computing device, responsive to a determination that the query seeks the obfuscated identifier, the set of discovery response data to the third mobile computing device,
 wherein:
  the first mobile device, the second mobile device, and the third mobile are unpaired with respect to one another.

2. The method of claim 1, further comprising:
 storing, by the first mobile computing device, responsive to receiving the set of discovery response data, the set of discovery response data to a memory; and
 retrieving, by the first mobile computing device, responsive to the query, the set of discovery response data from the memory.

3. The method of claim 1, further comprising:
 transmitting, by the first mobile computing device, a request to the second mobile computing device for the set of discovery response data.

4. The method of claim 1, wherein at least one of the receiving or transmitting steps is performed over a wireless network protocol.

5. The method of claim 1, wherein the set of discovery response data includes an obfuscated MCD identifier.

6. The method of claim 1 wherein the set of discovery response data includes a set of GPS coordinates.

7. The method of claim 6, further comprising:
 generating a set of navigational instructions based, in part, on the set of GPS coordinates.

8. A computer program product comprising:
 a computer readable storage medium and program instructions stored on the computer readable storage medium, the program instruction comprising instructions for a first mobile computing device to:
  receive a set of discovery response data from a second mobile computing device, wherein:
   an identity of the second mobile computing device is unknown to the first mobile computing device; and
   the set of discovery response data from the second mobile computing device includes an obfuscated identifier;
  receive a query from a third mobile computing device; and
  transmit, responsive to a determination that the query seeks the obfuscated identifier, the set of discovery response data to the third mobile computing device,
  wherein:
   the first mobile device, the second mobile device, and the third mobile are unpaired with respect to one another.

9. The computer program product of claim 8, further comprising instructions to:
 store, responsive to receiving the set of discovery response data, the set of discovery response data to a memory; and
 retrieve, responsive to the query, the set of discovery response data from the memory.

10. The computer program product of claim 8, further comprising instructions to:
 transmit a request to the second mobile computing device for the set of discovery response data.

11. The computer program product of claim 8, wherein at least one of the instructions to receive or transmit is performed over a wireless network protocol.

12. The computer program product of claim 8, wherein the set of discovery response data includes an obfuscated MCD identifier.

13. The computer program product of claim 8, wherein the set of discovery response data includes a set of GPS coordinates.

14. The computer program product of claim 13, further comprising instructions to:
 generate a set of navigational instructions based, in part, on the set of GPS coordinates.

15. A computer system comprising:
a processor set;
a computer readable storage medium;
program instructions stored on the computer readable storage medium for execution by the processor set, the program instructions comprising instructions for a first mobile computing device to:
  receive a set of discovery response data from a second mobile computing device, wherein:
    an identity of the second mobile computing device is unknown to the first mobile computing device; and
    the set of discovery response data from the second mobile computing device includes an obfuscated identifier;
  receive a query from a third mobile computing device; and
  transmit, responsive to a determination that the query seeks the obfuscated identifier, the set of discovery response data to the third mobile computing device, wherein:
    the first mobile device, the second mobile device, and the third mobile are unpaired with respect to one another.

16. The computer system of claim 15, further comprising instructions to:
  store, responsive to receiving the set of discovery response data, the set of discovery response data to a memory; and
  retrieve, responsive to the query, the set of discovery response data from the memory.

17. The computer system of claim 15, further comprising instructions to:
  transmit a request to the second mobile computing device for the set of discovery response data.

18. The computer system of claim 15, wherein at least one of the instructions to receive or transmit is performed over a wireless network protocol.

19. The computer system of claim 15, wherein the set of discovery response data includes an obfuscated MCD identifier.

20. The computer system of claim 15, wherein:
  the set of discovery response data includes a set of GPS coordinates; and
  the program instructions further comprise instructions to generate a set of navigational instructions based, in part, on the set of GPS coordinates.

* * * * *